United States Patent [19]

Kaijou

[11] Patent Number: 5,431,852
[45] Date of Patent: Jul. 11, 1995

[54] WATER-REPELLENT EMULSION COMPOSITION AND PROCESS FOR THE PRODUCTION THEREOF

[75] Inventor: Akira Kaijou, Sodegaura, Japan

[73] Assignee: Idemitsu Kosan Company Limited, Tokyo, Japan

[21] Appl. No.: 997,606

[22] Filed: Dec. 28, 1992

[30] Foreign Application Priority Data

Jan. 10, 1992 [JP] Japan .................. 4-003210
Apr. 1, 1992 [JP] Japan .................. 4-079625

[51] Int. Cl.$^6$ .......................... B01J 13/00; C09K 3/00
[52] U.S. Cl. ........................ 252/312; 252/314; 106/287.11; 106/287.34; 106/2
[58] Field of Search ............... 252/312, 321, 358, 314; 106/287.1, 287.11, 287.12, 287.34, 11, 285, 2

[56] References Cited

U.S. PATENT DOCUMENTS

| | | | |
|---|---|---|---|
| Re. 33,759 | 12/1991 | DePasquale et al. | 106/2 |
| 3,700,844 | 10/1972 | Domba | 554/39 |
| 4,225,456 | 9/1980 | Schmidt et al. | 252/321 |
| 4,274,977 | 6/1981 | Koerner et al. | 252/358 |
| 4,476,282 | 10/1984 | Koerner et al. | 524/837 |
| 4,529,758 | 7/1985 | Traver | 524/43 |
| 4,617,057 | 10/1986 | Plueddemann | 106/2 |
| 4,631,273 | 12/1986 | Blehm et al. | 252/312 |
| 4,648,904 | 3/1987 | DePasquale et al. | 106/2 |
| 4,950,502 | 8/1990 | Saam et al. | 252/312 |
| 5,001,183 | 3/1991 | Sands et al. | 106/490 |
| 5,185,037 | 2/1993 | Kaijou | 106/287.12 |

FOREIGN PATENT DOCUMENTS 62-197369 9/1987 Japan .

OTHER PUBLICATIONS

DATABASE WPIL, Week 9231, Derwent Publications Ltd., London, GB; AN 92-253916 of JP-A-4 170 313 (IDEMITSU KOSAN CO., LTD.) 18 Jun. 1992 abstact .

DATABASE WPIL, Week 8340, Derwent Publications Ltd., AN 83-780575 of JP-A-58 145 614 (SHOKUBAI KASEI KOGYO), 30 Aug. 1983 abstract .

DATABASE WPIL, Week 7819, Derwent Publications, Ltd., London, GB; AN 78-34376A of JP-A-53 034 829 (TOKUYAMA SODA KK) 31 Mar. 1978 abstract .

Primary Examiner—Gary Geist
Assistant Examiner—Daniel S. Metzmaier
Attorney, Agent, or Firm—Frishauf, Holtz, Goodman & Woodward

[57] ABSTRACT

A water-repellent emulsion composition containing, as essential components, colloidal silica particles which are surface-treated with a silylating agent; a nonpolar organic solvent; a cationic surfactant; one or both of a fluorine-containing surfactant and a silicone-containing surfactant; and water, and being excellent in dispersion stability, water repellency and barrier properties against water absorption.

21 Claims, No Drawings

WATER-REPELLENT EMULSION COMPOSITION AND PROCESS FOR THE PRODUCTION THEREOF

BACKGROUND OF THE INVENTION

1. Field of the Invention

The present invention relates to a water-repellent emulsion composition and a process for the production thereof. In particular, it relates to a water-repellent emulsion composition suitable as an aqueous-dispersion water repellent and a process for the production thereof.

2. Description of Prior Art

The deterioration of concrete structures has been one of the social issues of concern in recent years, and due to this, there have been developed a variety of water repellents to prevent the infiltration of external water, which is a main cause of the deterioration of concrete. These presently developed water repellents include solvent-base water repellents and aqueous-dispersion water repellents. The solvent-base water repellents involve problems in that they are liable to ignite and that they have high toxicity and really have a detrimental influence on a working environment and natural environment. There is therefore an increasing demand for aqueous-dispersion water repellents having low flammability and low toxicity.

The aqueous-dispersion water repellent having the above advantages refers to a water-repellent emulsion prepared by dispersing a water-repellent substance in an aqueous dispersant. For example there is known a water-repellent emulsion obtained by emulsifying alkylalkoxysilane as a water-repellent substance in water in the presence of a nonionic emulsifier as a dispersant (JP-A-62-197369).

Further, there are also disclosed an aqueous emulsion of an organic polysiloxane oil (U.S. Pat. No. 4,476,282) and a water-base dispersion of a silicon resin (U.S. Pat. No. 4,529,758).

Since, however, alkylalkoxysilane is highly hydrolyzable and requires a large amount of an emulsifier to be stable in water, there is a problem in that the water repellency decreases due to a large amount of the emulsifier which are incorporated to obtain an aqueous-dispersion water repellent having high dispersion stability.

Further, there is another problem in that the above aqueous emulsion of an organic polysiloxane oil and the above water-base dispersion of a silicon resin are still poor in water repellency and barrier properties against water absorption.

It is therefore an object of the present invention to provide an aqueous-dispersion water-repellent emulsion composition having high dispersion stability and having improved water repellency and improved barrier properties against water absorption, and a process for the production thereof.

SUMMARY OF THE INVENTION

The above objects and advantages of the present invention are achieved, first, by a water-repellent emulsion composition (I) containing, as essential components, colloidal silica particles which are surface-treated with a silylating agent; a nonpolar organic solvent; a cationic surfactant; one or both of a fluorine-containing surfactant and a silicone-containing surfactant; and water.

Furthermore, the above object and advantages of the present invention are achieved by a water-repellent emulsion composition (II) containing, as essential components, colloidal silica particles which are surface-treated with silylating agent; a cationic surfactant; a low-viscosity oil; a silicone-containing surfactant; and water.

The process (A) for the production of the above water-repellent emulsion composition (I), provided by the invention, comprises a step of adding a nonpolar organic solvent, a cationic surfactant and a silylating agent to a water-dispersed silica colloid to prepare an emulsion solution, a step of dehydrating the emulsion solution and then concentrating the emulsion solution to prepare a hydrophobic silica sol solution, and a step of adding and mixing at least one or both of a fluorine-containing surfactant and a silicone-containing surfactant to/with the hydrophobic silica sol solution and then adding water to the resultant mixture to form an emulsion.

The process (B) for the production of the above water-repellent emulsion composition (II), provided by the present invention, comprises a step of adding a nonpolar organic solvent, a cationic surfactant and a silylating agent to a water-dispersed silica colloid to prepare a first emulsion solution, a step of azeotropically dehydrating the first emulsion solution to prepare a solution of dispersed silica sol in the nonpolar organic solvent, a step of adding a low-viscosity oil, a silicone-containing surfactant and water to the solution of dispersed silica sol in the nonpolar organic solvent to prepare a second emulsion solution, and a step of distilling off the nonpolar organic solvent contained in the second emulsion solution.

DETAILED DESCRIPTION OF THE INVENTION

The present invention will be detailed hereinafter.

First, the water-repellent emulsion composition (I) of the present invention will be explained. As described above, the emulsion composition (I) contains, as essential components, colloidal silica particles which are surface-treated with a silylating agent; a nonpolar solvent; a cationic surfactant; one or both of a fluorine-containing surfactant and a silicone-containing surfactant; and water. The specific examples and contents of these essential components are as described in the following (1) to (5).

(1) Colloidal silica particles which are surface-treated with a silylating agent The colloidal silica particles are required to be surface-treated with a silylating agent to impart them with water repellency. The colloidal silica particles per se before the surface treatment are not specially limited. Examples of the colloidal silica particles include colloidal silica particles obtained by an acid-decomposition electrolytic dialysis method using water-glass, a deflocculation method, an ion-exchange method and a hydrolysis method using ethyl silicate.

The silylating agent is not specially limited in kind, either. Specific examples of the silylating agent include alkyl-substituted halosilanes (octadecyltrichlorosilane, octadecylmethyldichlorosilane and octadecyldimethylchlorosilane), alkyl-substituted alkoxysilanes (octadecyltrimethoxysilane, octadecylmethyldimethoxysilane and octadecyldimethylmethoxysilane), alkyl-substituted silazanes (hexamethyldisilazane) and hydroxysilanes obtained by hydrolysis of these.

The content of the colloidal silica particles which are surface-treated with a silylating agent is preferably 0.1 to 30% by weight when the total content of the essential components in the water-repellent emulsion composition (I) is 100% by weight. When the above content is less than 0.1% by weight, no water-repellent emulsion composition (I) having sufficient water repellency can be obtained. When the above content exceeds 30% by weight, it increases the price of the water-repellent emulsion composition (I). The content of the surface-treated colloidal silica particles is particularly preferably 1 to 20% by weight.

(2) Nonpolar organic solvent

The nonpolar organic solvent is not specially limited in kind, either. Specific examples of the nonpolar organic solvent include aromatic hydrocarbon solvents such as benzene, toluene, xylene, ethylbenzene and cumene, alicyclic hydrocarbon solvents such as cyclohexane, ethylcyclohexane and decalin, aliphatic hydrocarbon solvents such as pentane, heptane and octane, industrial gasolines such as mineral spirit, petroleum solvents such as kerosene, petrochemical solvents and mixtures of these. For example, a mixture prepared by blending at least two solvents of the same series such as a mixture of benzene and toluene may be used.

The content of the nonpolar organic solvent is preferably 1 to 40% by weight when the total content of the essential components in the water-repellent emulsion composition (I) is 100% by weight. When this content is less than 1% by weight, the resultant water-repellent emulsion composition (I) shows poor dispersion stability. When it exceeds 40% by weight, the working environment is deteriorated when the water-repellent emulsion composition (I) is applied, and in particular, it is difficult to apply it indoors. The content of the nonpolar organic solvent is particularly preferably 5 to 20% by weight.

(3) Cationic surfactant

Specific examples of the cationic surfactant include alkylamine salts, polyamine fatty acid derivatives, aminoalcohol fatty acid derivatives, alkyl quaternary ammonium salts (e.g., alkyltrimethylammonium salt), cyclic quaternary ammonium salts (e.g., alkylpyridinium salt), quaternary ammonium salts having a hydroxyl group, quaternary ammonium salts having an ether bond and quaternary ammonium salts having an amide bond, although the cationic surfactant shall not be limited thereto.

The content of the cationic surfactant is preferably 0.001 to 1% by weight when the total content the essential components in the water-repellent emulsion composition (I) is 100% by weight. The cationic surfactant is essential for producing the water-repellent emulsion composition (I). When the final concentration of the cationic surfactant is less than 0.001% by weight, the intended water-repellent emulsion composition (I) cannot be produced. When the final concentration of the cationic surfactant exceeds 1% by weight, the water repellency of the water-repellent emulsion composition (I) is too low. The content of the cationic surfactant is particularly preferably 0.01 to 0.5% by weight.

(4) Fluorine-containing surfactant and/or silicon-containing surfactant

The fluorine-containing surfactant is selected from organic compounds containing fluorine atom(s) and having surface activity, such as fluorinated alkyl group-containing polyalkylene oxide compounds. Specific examples thereof include nonionic surfactants such as FC-170C, FC-430 and FC-431 (supplied by Sumitomo-3M Co., Ltd.).

The silicone-containing surfactant is selected from organic compound containing silicon atom(s) and having surface activity, such as polyalkylene-modified polydimethylsiloxane compounds. Specific examples thereof include nonionic surfactants such as TSF4440 and TEA4300 (both supplied by Toshiba Silicone Co., Ltd.) and PSO71, PSO72, PSO73 and PSO74 (all supplied by Chisso Corp.).

The content of the fluorine-containing surfactant and/or the silicone-containing surfactant (the total content when these two surfactants are used) is preferably 0.01 to 0.5% by weight when the total content of the essential components in the water-repellent emulsion composition (I) is 100% by weight. When this content is less than 0.01 by weight, no water-repellent emulsion composition having excellent dispersion stability can be obtained as the water-repellent emulsion composition (I). When it exceeds 0.5% by weight, the resultant water-repellent emulsion composition forms a nonuniform coating when applied, since the surfactant remains on a coating surface. The content thereof is particularly preferably 0.1 to 0.5% by weight.

(5) Water

The water is selected from tap water, ion-exchanged water and distilled water, although it shall not be limited to the above The content of the water is preferably at least 20% by weight when the total content of the essential components in the water-repellent emulsion composition (I) is 100% by weight. When this content is less than 20% by weight, the resultant water-repellent emulsion composition (I) is poor in dispersion stability, and further, a working environment is deteriorated when it is applied. The water content is particularly preferably 60% by weight or more.

In addition to the above five essential components, the water-repellent emulsion composition (I) of the present invention may contain other optional component Specific examples of the "other component" include higher alcohols such as 2-pentanol, 3-pentanol, n-hexanol, n-heptanol and n-octanol. Any one of these higher alcohols an optional component is useful for further improving the emulsion stability.

The content of the higher alcohol is preferably 0.1 to 5% by weight on the basis of the total weight of the composition. When this content is less than 0.1% by weight, the higher alcohol hardly exhibits its effect. When it exceeds 5% by weight, the resultant water-repellent emulsion composition (I) emits an alcoholic odor. The content of the higher alcohol is particularly preferably 1 to 5% by weight.

The water-repellent emulsion composition (I) containing the above-specified five essential components and optionally containing the above optional component, provided by the present invention, has high dispersion stability and is excellent in water repellency and barrier properties against water absorption, since it contains colloidal silica particles whose surfaces are silylated and since it is emulsified by the fluorine-containing surfactant and/or the silicone-containing surfactant.

The water-repellent emulsion composition of the present invention, having the above advantages, can be produced, for example, by the process (A) of the present invention, which comprises a step of adding a nonpolar organic solvent, a cationic surfactant and a silylating agent to a water-dispersed silica colloid to prepare an emulsion solution (hereinafter referred to as a "first step"), a step of dehydrating the emulsion solution and then concentrating the emulsion solution to prepare a hydrophobic silica sol solution (hereinafter referred to as a "second step"), and a step of adding and mixing at least one or both of a fluorine-containing surfactant and a silicon-containing surfactant to/with the hydrophobic silica sol solution and then adding water to the resultant mixture to form an emulsion (hereinafter referred to as a "third step").

The water-dispersed silica colloid used in the above first step is not specially limited, and there can be suitably used a water-dispersed silica colloid obtained by any one of an acid-decomposition electrolytic dialysis method using water-glass, a deflocculation method, an ion-exchange method and a hydrolysis method using ethyl silicate. The silica concentration in the water-dispersed silica colloid is preferably 1 to 50% by weight. The reasons therefor are as follows. Water in the water-dispersed silica colloid is required to be azeotropically removed as much as possible in the second step to be detailed later. When the silica concentration is less than 1% by weight, the amount of water in the water-dispersed silica colloid is too large, and as a result, it is required to use a large amount of a nonpolar organic solvent necessary for azeotropic removal of water. When the silica concentration is exceeds 50% by weight, the stability of the silica colloid becomes poor. The silica concentration is particularly preferably 20 to 50% by weight.

The nonpolar organic solvent to be added to the water-dispersed silica colloid is not specially limited kind. Specific, examples of the nonpolar organic solvent include those nonpolar organic solvents described concerning the above-specified water-repellent emulsion composition (i) of the present invention, although the nonpolar organic solvent shall not be limited thereto. The amount of the nonpolar organic solvent per gram of water in the water-dispersed silica colloid is preferably 3 to 30 g. When this amount is less than 3 g, water in the water-dispersed silica colloid cannot be sufficiently azeotropically removed at the second step to be detailed later. When it exceeds 30 g, the concentration in the second step takes a long period of time. The amount of the nonpolar solvent is particularly preferably 5 to 10 g.

The cationic surfactant used in the first step is not specially limited in kind, either. Specific examples of the cationic surfactant include those cationic surfactants described concerning the above-specified water-repellent emulsion composition (I) of the present invention, although the cationic surfactant shall not be limited thereto. The cationic surfactant is used to prevent the aggregation of negatively charged colloidal silica particles in the water-dispersed silica colloid by surrounding the colloidal silica particles with the cationic surfactant. Due to this, the dispersion stability can be maintained without bringing pH into an acidic side.

The amount of the cationic surfactant is preferably 0.001 to 10 g per gram of silica in the water-dispersed silica colloid. When this amount is less than 0.001 g, the emulsion is separated in azeotropic removal water in the second step to be described later. When it exceeds 10 g, the water repellency of a finally obtained water-repellent emulsion composition is too low. The amount of the cationic surfactant is more preferably 0.005 to 2 g, particularly preferably 0.01 to 0.5 g.

The silylating agent used together with the above water-dispersed silica colloid, nonpolar organic solvent and cationic surfactant in the first step is not specially limited in kind, either. Specific examples of the silylating agent include those silylating agents described concerning the water-repellent emulsion composition (I) of the present invention, although the silylating agent shall not be limited thereto.

The amount of the silylating agent is preferably 0.1 to 10 g per gram of silica in the water-dispersed silica colloid. When this amount is less than 0.1 g, no water-repellent emulsion composition having sufficient water repellency can be obtained as the water-repellent emulsion composition (I). When it exceeds 10 g, the production cost is made to increase since the silylating agent is expensive. The amount of the silylating agent is particularly preferably 0.5 to 1 g.

In the first step, the nonpolar organic solvent, cationic surfactant and silylating agent are added to the water-dispersed silica colloid, and then the resultant mixture is emulsified to obtain an emulsion solution. This emulsification can be carried out, for example, by stirring at a high velocity with a homogenizer.

In the process (A) of the present invention, after the emulsion solution is obtained as described above, there is carried out the second step in which the emulsion solution is dehydrated and concentrated to obtain a hydrophobic silica sol. The dehydration is carried out, for example, by a general azeotropic distillation, and the azeotropic distillation is generally carried out for 0.1 to 5 hours. The concentration is also carried out by a conventional method, specifically by a reduced-pressure concentration method using an evaporator, although the concentration shall not be limited thereto.

Since the concentration is carried out after the dehydration, the amount of the nonpolar solvent in a finally obtained water-repellent emulsion composition is low, and the adverse effect of the use of the nonpolar solvent on a working environment and natural environment can be therefore decreased.

In the process (A) of the present invention, in the course of the above first and second steps, a hydroxyl group (-OH) on the surface of each colloidal silica particle reacts with the silylating agent to form a water-repellent group, and as a result, there is obtained a hydrophobic silica sol solution.

The process (A) of the present invention includes the third step in which at least a fluorine-containing surfactant and/or a silicone-containing surfactant are/is added to, and mixed with, the above-obtained hydrophobic silica sol solution, water is added, and the resultant mixture is emulsified.

The fluorine-containing surfactant and/or the silicone-containing surfactant used in the third step are/is not specially limited in kind. Examples thereof include those fluorine-containing surfactants and silicon-containing surfactants described concerning the water-repellent emulsion composition (I) of the present invention, although they shall not be so limited. The content of the fluorine-containing surfactant and/or the silicone-containing surfactant is preferably 0.01 to 0.5% by weight when the total content of the colloidal silica particles (surface-treated with the silylating agent), the nonpolar organic solvent, the cationic surfactant, the fluorine-containing surfactant and/or the silicone-containing surfactant and water in the water-repellent emulsion composition to be finally obtained is 100% by weight. When the above content is less than 0.01% by weight, no water-repellent emulsion composition having excellent dispersion stability is obtained. When it exceeds 0.5% by weight, the resultant water-repellent emulsion composition forms a nonuniform coating when applied, since the surfactant remains on a coating surface. The content thereof is particularly preferably 0.1 to 0.5% by weight.

The above fluorine-containing surfactant and/or the silicone-containing surfactant and the hydrophobic silica sol can be mixed by a conventional method, specifically by mixing them while stirring them with a stirrer, although the mixing method shall not be so limited.

In the third step, after the above mixing, water is added to the above-obtained mixture to form an emulsion. The water used in this step is selected from tap water, ion-exchanged water and distilled water, although it shall not be so limited. The content of the water is preferably at least 20% by weight when the total content of the colloidal silica particles (surface-treated with the silylating agent), the nonpolar organic solvent, the cationic surfactant, the fluorine-containing surfactant and/or the silicone-containing surfactant and water in the water-repellent emulsion composition to be finally obtained is by weight When the water content is less than 20% by weight, the resultant water-repellent emulsion composition (I) is poor in dispersion stability, and further, a working environment is deteriorated when it is applied. The water content is particularly preferably 60% by weight or more.

After water is added, the resultant mixture is emulsified, e.g., by stirring the mixture at a high velocity with a homogenizer. By this emulsification, the intended water-repellent emulsion composition (I) is obtained.

In the process (A) of the present invention, optional component(s) may be added in the third step. Examples of the other component(s) include those higher alcohols described concerning the water-repellent emulsion composition (I) of the present invention.

By adding a higher alcohol as an optional component in the third step, there can be obtained a water-repellent emulsion composition having much more improved dispersion stability as the water-repellent emulsion composition (I).

The water-repellent emulsion composition (II) will be explained hereinafter. As described above, the water-repellent emulsion composition (II) contains, as essential components, colloidal silica particles which are surface-treated with a silylating agent; a cationic surfactant; a low-viscosity oil; a silicone-containing surfactant; and water. These essential components will be explained hereinafter.

(1) Colloidal silica particles which are surface-treated with a silylating agent Like the colloidal silica particles of the above water-repellent emulsion composition (I), the colloidal silica particles for the water-repellent emulsion composition (II) are required to be surface-treated with a silylating agent to impart them with water repellency. The colloidal silica particles per se before the surface treatment are not specially limited, and they are selected from those described concerning the water-repellent emulsion composition (I).

The silylating agent is not specially limited in kind, either, and it is selected from those described concerning the water-repellent emulsion composition (I).

The content of the colloidal silica particles which are surface-treated with a silylating agent is 0.1 to 30% by weight when the total content of the essential components of the water-repellent emulsion composition (II) is 100% by weight. When this content is less than 0.1% by weight, no water-repellent emulsion composition having sufficient water repellency is obtained as the water-repellent emulsion composition (II). When it exceeds 30% by weight, the water-repellent emulsion composition (II) is expensive. The content of the surface-treated colloidal silica particles is particularly preferably 1 to 20% by weight.

(2) Cationic surfactant

Specific examples of the cationic surfactant include those cationic surfactants described concerning the water-repellent emulsion composition (I).

The content of the cationic surfactant is 0.001 to 1% by weight when the total content of the essential components in the water-repellent emulsion composition (II) is 100% by weight. The cationic surfactant is essential for producing the water-repellent emulsion composition (II When the final concentration of the cationic surfactant is less than 0.001% by weight, the intended water-repellent emulsion composition (II) cannot be produced. When the final concentration of the cationic surfactant exceeds 1% by weight, the water repellency of the water-repellent emulsion composition (II) is too low. The content of the cationic surfactant is particularly preferably 0.01 to 0.5% by weight.

(3) Low-viscosity oil

The low-viscosity oil is preferably selected from those having a viscosity of 200 cSt or less. It can be selected from a variety of oils such as isoparaffinic synthetic oils and aromatic synthetic oils regardless of their chemical compositions if they have a viscosity of 200 cSt or less. When an oil having a viscosity of more than 200 cSt is used, undesirably, the dispersibility in water to be described later decreases.

The content of the low-viscosity oil is 0.1 to 10% by weight when the total content of the essential components in the water-repellent emulsion composition (II) of the present invention is 100% by weight. When this content is less than 0.1% by weight, the dispersion stability of the resultant water-repellent emulsion composition is too low. When it exceeds 10% by weight, the water repellency of the resultant water-repellent emulsion composition is too low. The content of the low-viscosity oil is particularly preferably 0.5 to 5% by weight. When the low-viscosity oil is used in the emulsion composition (II), there can be obtained a stable water-repellent emulsion even if the nonpolar organic solvent is wholly distilled off by steam distillation, etc., to be described later. That is, the emulsion composition (II) does not need to contain any flammable nonpolar organic solvent, and as a result, it is hardly flammable. It is therefore excellent in terms of environmental sanitation.

(4) Silicone-containing surfactant

The silicon-containing surfactant is selected from any organic compounds containing a silicon atom and surface activity. Examples of the silicone-containing surfactant include polyethylene oxide-modified silicone oils (trade names: TSF 4440, TSF 4445 and TSF 4446, supplied by Toshiba Silicone Co., Ltd.), polypropylene oxide-modified silicone oils (trade name TSF 4460 supplied by Toshiba Silicone Co., Ltd.) polyethylene oxide-polypropylene oxide-modified silicone oils (trade names: TSF 4450 and TSF 4452, supplied by Toshiba Silicone Co., Ltd.).

The content of the silicone-containing surfactant is 0.01 to 1% by weight when the total content of the essential components in the water-repellent emulsion composition (II) of the present invention is 100% by weight. When this content is less than 0.01% by weight, water-repellent emulsion composition having excellent dispersion stability can be obtained as the water-repellent emulsion composition (II). When it exceeds 1% by weight, the resultant water-repellent emulsion composition (II) is expensive since the silicone-containing surfactant is expensive. The above content is particularly preferably 0.1 to 1% by weight.

(5) Water

The water is selected from tap water, ion-exchanged water and distilled water, although it shall not be so limited.

The content of the water is 58 to 99% by weight when the total content of the essential components in the water-repellent emulsion composition (II) of the present invention is 100% by weight. When this content is less than 58% by weight or when it exceeds 99% by weight, the contents of the other essential components are outside the above-specified ranges, and the resultant water-repellent emulsion composition (II) is too poor in water repellency and dispersion stability. Further, when the water content is less than 58% by weight, the amounts of the above components (1) to (4) increase, which leads to an increase in the price of the water-repellent emulsion composition (II). The water content is particularly preferably 73 to 98% by weight.

The water-repellent emulsion composition (II) containing the above five components as essential components, provided by the present invention, has high dispersion stability and is excellent in water repellency and barrier properties against water absorption, since it contains colloidal silica particles whose surfaces are silylated and since it is emulsified with the silicon-containing surfactant.

The water-repellent emulsion composition (II) of the present invention, which has the above advantages, can be produced by the process (B) of the present invention, which comprises a step of adding a nonpolar organic solvent, a cationic surfactant and a silylating agent to a water-dispersed silica colloid to prepare a first emulsion solution (hereinafter sometimes referred to as a "first step"), a step of azeotropically dehydrating the first emulsion solution to prepare a solution of dispersed silica sol in the nonpolar organic solvent (hereinafter sometimes referred to as a "second step"), a step of adding a low-viscosity oil, a silicone-containing surfactant and water to the solution of dispersed silica sol in the nonpolar organic solvent to prepare a second emulsion solution (hereinafter sometimes referred to as a "third step"), and a step of distilling off the nonpolar organic solvent contained in the second emulsion solution (hereinafter sometimes referred as a "fourth step"), although it shall not be limited to the above process alone.

The water-dispersed silica colloid used in the above first step is not specially limited, and there can be suitably used a water-dispersed silica colloid obtained by any one of an acid-decomposition electrolytic dialysis method using water-glass, a deflocculation method, an ion-exchange method and a hydrolysis method using ethyl silicate. The silica concentration in the water-dispersed silica colloid is preferably 1 to 50% by weight. The reasons therefor are as follows. Water in the water-dispersed silica colloid is required to be azeotropically removed as much as possible in the second step to be detailed later. When the silica concentration is less than 1% by weight, the amount of water in the water-dispersed silica colloid is too large, and as a result, it is required to use a large amount of a nonpolar organic solvent necessary for azeotropic removal of water. When the silica concentration is exceeds 50% by weight, the stability of the silica colloid becomes poor. The silica concentration is particularly preferably 20 to 50% by weight.

The nonpolar organic solvent to be added to the water-dispersed silica colloid is not specially limited in kind, either. Specific examples of the nonpolar solvents include aromatic hydrocarbon solvents such as benzene, toluene, xylene, ethylbenzene and cumene, alicyclic hydrocarbon solvents such as cyclohexane, ethylcyclohexane and decalin, aliphatic hydrocarbon solvents such as pentane, heptane and octane, industrial gasolines such as mineral spirit, petroleum solvents such as kerosene, petrochemical solvents and mixtures of these. For example, a mixture prepared by blending at least two solvents of the same series such as a mixture of benzene and toluene may be used.

The amount of the nonpolar solvent per gram of water in the water-dispersed silica colloid is preferably 3 to 30 g. When this amount is less than 3 g, water in the water-dispersed silica colloid cannot be sufficiently azeotropically removed at the second step to be detailed later. When it exceeds 30 g, the distillation in the fourth step to be detailed later takes a long period of time. The amount of the nonpolar solvent is particularly preferably 5 to 20 g per gram of the above water.

The cationic surfactant used in the first step not specially limited in kind, either. Specific examples of the cationic surfactant include those cationic surfactants described concerning the above-specified water-repellent emulsion composition (II) of the present invention, although the cationic surfactant shall not be limited thereto. The cationic surfactant is used to prevent the aggregation of negatively charged colloidal silica particles in the water-dispersed silica colloid by surrounding the colloidal silica particles with the cationic surfactant. Due to this, the dispersion stability can be maintained without bringing pH into an acidic side.

The amount of the cationic surfactant is preferably 0.001 to 10 g per gram of silica in the water-dispersed silica colloid. When this amount is less than 0.001 g, the emulsion is separated in azeotropic removal of water in the second step to be described later. When it exceeds 10 g, the water repellency of the finally obtained water-repellent emulsion composition (II) is too low. The amount of the cationic surfactant is more preferably 0.005 to 2 g, particularly preferably 0.01 to 0.5 g.

The silylating agent used together with the above water-dispersed silica colloid, nonpolar organic solvent and cationic surfactant in the first step is not specially limited in kind, either. Specific examples of the silylating agent include those silylating agents described concerning the water-repellent emulsion composition (II) of the present invention, although the silylating agent shall not be limited thereto.

The amount of the silylating agent is preferably 0.1 to 10 g per gram of silica in the water-dispersed silica colloid. When this amount is less than 0.1 g, no water-repellent emulsion composition having sufficient water repellency can be obtained as the water-repellent emulsion composition (II). When it exceeds 10 g, the production cost is made to increase since the silylating agent is expensive. The amount of the silylating agent is particularly preferably 0.5 to 1 g.

In the first step, predetermined amounts of the water-dispersed silica colloid, nonpolar organic solvent, cationic surfactant and silylating agent are stirred at a high velocity, e.g., with a homogenizer to obtain a first emulsion solution. (The emulsion solution obtained in the first step is referred to as "first emulsion solution" to distinguish it from an emulsion solution to be obtained in the third step, and the latter is referred to as a "second emulsion solution".)

In the process (B) of the present invention, thee is carried out the second step in which the first emulsion solution obtained in the above first step is azeotropically dehydrated to obtain a solution of dispersed silica sol in the nonpolar organic solvent. The azeotropic dehydration is carried out, for example, by general azeotropic distillation, and the azeotropic distillation is generally carried out for 0.1 to 5 hours.

In the process (B) of the present invention, there is carried out a third step in which a low-viscosity oil, a silicone-containing surfactant and water are added to the above solution of dispersed silica sol in the nonpolar solvent to obtain a second emulsion solution.

The low-viscosity oil used in the third step is not specially limited in kind if it has a viscosity of 200 cSt or less. Examples thereof include those low-viscosity oils described concerning the water-repellent emulsion composition (II) of the present invention, although it shall not be limited to those. As described above, due to the use of the low-viscosity oil in the process (B) of the present invention, a stable water-repellent emulsion can be obtained even if the nonpolar organic solvent is entirely distilled off in the fourth step to be described later. This emulsion does not need to contain any flammable nonpolar organic solvent, and it is therefore excellent in terms of environmental sanitation.

The content of the low-viscosity oil is 0.1 to 10% by weight when the total content of the colloidal silica particles (surface-treated with the silylating agent), the cationic surfactant, the low-viscosity oil, a silicon-containing surfactant to be described later and water to be described later in the water-repellent emulsion composition (II) to be finally obtained is 100% by weight. When the above content is less than 0.1% by weight, the dispersion stability of the resultant water-repellent emulsion composition (II) is too poor. When it exceeds 10% by weight, the water repellency of the water-repellent emulsion composition (II) is too low. The content of the low-viscosity oil is particularly preferably 0.5 to 5% by weight.

The silicone-containing surfactant used in the third step is not specially limited in kind, either. Examples thereof include those silicon-containing surfactants described concerning the water-repellent emulsion composition (II) of the present invention, although it shall not be so limited.

The content of the silicone-containing surfactant is 0.01 to 1% by weight when the total content of the colloidal silica particles (surface-treated with the silylating agent) the cationic surfactant the low-viscosity oil, the silicone-containing surfactant and water to be described later in the water-repellent emulsion-composition (I) to be finally obtained is 100% by weight When the above content is less than 0.01% by weight, no water-repellent emulsion composition having excellent dispersion stability can be obtained as the water-repellent emulsion composition (II). When it exceeds 1% by weight, the cost for producing the water-repellent emulsion composition (II) increases since the silicone-containing surfactant is expensive. The above content is particularly preferably 0.1 to 1% by weight.

The water used in the third step is selected from tap water, ion-exchanged water and distilled water, although it shall not be so limited. The content of the water is 58 to 99% by weight when the total content of the colloidal silica particles (surface-treated with the silylating agent), the cationic surfactant, the low-viscosity oil, thee silicone-containing surfactant and water in the water-repellent emulsion composition (II) to be finally obtained is 100% by weight. When this content is less than 58% by weight or when it exceeds 99% by weight, the contents of the other essential components (colloidal silica particles surface-treated with the silylating agent, the cationic surfactant, the low-viscosity oil and the silicone-containing surfactant) are outside the above-specified ranges, and the resultant water-repellent emulsion composition (II) is too poor in water repellency and dispersion stability. Further, when the water content is less than 58% by weight, the amounts of the other components increase, which leads to an increase in the price of the water-repellent emulsion composition (II). The water content is particularly preferably 73 to 98% by weight.

In the third step, predetermined amounts of the above low-viscosity oil, silicone-containing surfactant and water are added to the solution of dispersed silica sol in the nonpolar organic solvent obtained in the step 2, and the resultant mixture is stirred at a high velocity, e.g., with a homogenizer to obtain a second emulsion solution.

In the process (B) of the present invention, there is carried out the fourth step in which the nonpolar organic solvent contained in the second emulsion solution obtained in the above third step is distilled off.

In the fourth step, the nonpolar organic solvent is distilled off by steam distillation using an evaporator or distillation under reduced pressure (vacuum distillation or molecular distillation), although the distillation method shall not be so limited. The nonpolar organic solvent contained in the second emulsion solution is distilled to obtain the water-repellent emulsion composition (II).

The present invention will be described hereinafter by reference to the following Examples.

EXAMPLE 1

(Emulsion composition (I))

400 Grams of a nonpolar organic solvent (toluene), 2 g of a commercially available cationic surfactant (trade name: Cortamine D86P, surfactant concentration 20%, supplied by Kao Corp.) and 7.5 g of a silylating agent (octadecyltrimethoxysilane) were added to 50 g of a commercially available water-dispersed silica colloid (trade name: S-20L, silica concentration 20 wt. %, supplied by Shokubai Kasei K. K.), and the resultant mixture was stirred with a homogenizer for 10 minutes to prepare an emulsion solution. This emulsion solution was placed in a 1-liter, three-necked flask having a stirrer, a condenser and a distilling device, and azeotropically distilled for about 1 hour with continuously stirring while the steam temperature was observed. When the steam temperature reached the boiling point (110.6° C.) of toluene, the distillation was terminated. The content was recharged into a 500-cc eggplant type flask and concentrated to 60 g with an evaporator to obtain a hydrophobic silica sol solution.

0.6 Gram of a fluorine-containing surfactant (FC-430, supplied by Sumitomo-3M Co., Ltd.) was added to, and mixed with, the above-obtained silica sol solution. Then, 523 g of ion-exchanged water was added, and the resultant mixture was stirred and mixed for 10 minutes with a homogenizer to give a water-repellent emulsion compositions.

The above water-repellent emulsion composition had the following composition.

| Colloidal silica particles surface-treated with silylating agent | 3.0 wt.% |
|---|---|
| Nonpolar organic solvent (toluene) | 7.0 wt.% |
| Cationic surfactant | 0.3 wt.% |
| Fluorine-containing surfactant | 0.1 wt.% |
| Ion-exchanged water | 89.6 wt.% |

EXAMPLE 2

(Emulsion composition (I))

A hydrophobic silica sol solution was obtained in the same manner as in Example 1, and 0.6 g of a fluorine-containing surfactant (trade name: FC-430, supplied by Sumitomo-3M Co., Ltd.) as an essential component and 20 g of a higher alcohol (3-pentanol) as an optional component were added to the above hydrophobic silica sol solution with stirring. Then, 503 g of ion-exchanged water was added, and the resultant mixture was stirred with a homogenizer for 10 minutes to obtain a water-repellent emulsion composition.

The above water-repellent emulsion composition had the following composition.

| Colloidal silica particles surface-treated with silylating agent | 3.0 wt.% |
|---|---|
| Nonpolar organic solvent (toluene) | 7.0 wt.% |
| Cationic surfactant | 0.3 wt.% |
| Fluorine-containing surfactant | 0.1 wt.% |
| Ion-exchanged water | 86.2 wt.% |
| Higher alcohol (3-pentanol) | 3.4 wt.% |

EXAMPLE 3

(Emulsion composition (I))

A hydrophobic silica sol solution was obtained in the same manner as in Example 1, and 1.8 g of a silicon-containing surfactant (trade name: TSF4440, supplied by Toshiba Silicone Co., Ltd.) as an essential component was added to the above hydrophobic silica sol solution with stirring. Then, 522 g of ion-exchanged water was added, and the resultant mixture was stirred with a homogenizer for 10 minutes to obtain a water-repellent emulsion composition.

The above water-repellent emulsion composition had the following composition.

| Colloidal silica particles surface-treated with silylating agent | 3.0 wt.% |
|---|---|
| Nonpolar organic solvent (toluene) | 7.0 wt.% |
| Cationic surfactant | 0.3 wt.% |
| Silicone-containing surfactant | 0.3 wt.% |
| Ion-exchanged water | 89.4 wt.% |

Test on water repellency

1 Gram of the water-repellent emulsion composition obtained in Example 1 was applied to a JIS 1-3 mortar plate (70×70×20 mm), and dried at room temperature for 1 day. Then, one drop of water (0.03 cc) was dropped thereon through a dropping pipette, and the water-repellent emulsion composition was measured for a contact angle by photography.

The above procedures were repeated concerning each of the water-repellent emulsion compositions obtained in Examples 2 and 3 for measuring contact angles.

Further, the above procedures were also repeated concerning a commercially available water-base emulsion solution (appearance: pure white liquid, higher alkoxysilane content: 40%, dispersant: water, pH: 6-8, viscosity: less than 10 cp, specific gravity: 0.95) for measuring a contact angle.

Table 1 shows the results.

Water permeability test

2 Grams of each of the water-repellent emulsion compositions obtained in Examples 1 to 3 was separately applied to a flexible board (100×100×6 mm), and tested on water permeability according to JIS A 6910.

The above commercially available water-base emulsion solution was also tested on water permeability in the same manner as above.

Table 1 shows the results.

TABLE 1

| Water-repellent emulsion compositions | Contact angle (°) | Permeability (ml/day) |
|---|---|---|
| from Example 1 | 90 | 0.25 |
| from Example 2 | 90 | 0.3 |
| from Example 3 | 90 | 0.35 |
| Comparison | 60 | 2.6 |

As is clearly shown in Table 1, the water-repellent emulsion compositions (I) obtained in Examples 1 to 3 showed contact angles of 90°, and these values were much greater than that of the commercially available one used for comparison. The above data shows that the water-repellent emulsion compositions obtained in Examples 1 to 3 are excellent in water repellency.

Further, the water-repellent emulsion compositions (I) obtained in Examples 1 to 3 showed a water permeability value of 0.25 to 0.35 ml/day, and these values were much smaller than that of the commercially available one used for comparison. The above data shows that the water-repellent emulsion compositions obtained in Examples 1 to 3 are excellent in barrier properties against water absorption.

Test on dispersion stability

The water-repellent emulsion compositions (I) obtained in Examples 1 to 3 were separately placed in 100 cc sample bottles, and allowed to stand at room temperature for 30 days to determine whether these emulsion compositions would separate.

As a result, the water-repellent emulsion compositions (I) showed no separation, and it has been found that these water-repellent emulsion compositions (I) are excellent in dispersion stability.

EXAMPLE 4

(Emulsion composition (II))

400 Grams of a nonpolar solvent (toluene), 2 g of a commercially available cationic surfactant (trade name: Cortamine D86P, surfactant concentration 20%, supplied by Kao Corp.) and 7.5 g of a silylating agent (octadecyltrimethoxysilane) were added to 50 g of a commercially available water-dispersed silica colloid (trade name. S-20L silica concentration 20 wt. % supplied by Shokubai Kasei K. K.), and the resultant mixture was stirred with a homogenizer for 10 minutes to prepare a first emulsion solution.

This first emulsion solution was placed in a 1-liter, three-necked flask having a stirrer, a condenser an a distilling device, and azeotropically distilled for about 1 hour with continuously stirring while the steam temperature was observed. When the steam temperature reached the boiling point (110.6° C.) of toluene, the distillation was terminated to give 192 g of a solution of dispersed silica sol in toluene.

1.8 Grams of a silicone-containing surfactant (trade name: TSF4450, supplied by Toshiba Silicone Co., Ltd.), 6 g of a low-viscosity oil (trade name: MC Oil W8, aromatic synthetic oil having a viscosity of 8 cSt, supplied by Idemitsu Kosan Co., Ltd.) and 700 g of water were added to the above solution of dispersed silica sol in toluene, and the resultant mixture was stirred with a homogenizer for 10 minutes to give a second emulsion composition.

The toluene contained in the second emulsion composition was distilled off by steam distillation using an evaporator to give a water-repellent emulsion composition.

The above-obtained water-repellent emulsion composition had the following composition.

| Colloidal silica particles surface-treated with silylating agent | 3.0 wt.% |
|---|---|
| Cationic surfactant | 0.3 wt.% |
| Silicone-containing surfactant | 0.3 wt.% |
| Low-viscosity oil | 1.0 wt.% |
| Water | 95.4 wt.% |

Test on water repellency

1 Gram of the water-repellent emulsion composition obtained in Example 4 was applied to a JIS 1-3 mortar plate (70×70×20 mm), and dried at room temperature for 1 day. Then, one drop of water (0.03 cc) was dropped thereon through a dropping pipette and the water-repellent emulsion composition was measured for a contact angle by photography.

Further, the above procedures were also repeated concerning a commercially available water-base emulsion solution (appearance: pure white liquid, higher alkoxysilane content: 40%, dispersant: water, pH: 6-8, viscosity: less than 10 cp, specific gravity: 0.95) for measuring a contact angle.

Table 2 shows the results.

Water permeability test

2 Grams of the water-repellent emulsion composition obtained in Example 4 was applied to a flexible board (100×100×6 mm), and tested on water permeability according to JIS A 6910.

The above commercially available water-base emulsion solution was also tested on water permeability in the same manner as above.

Table 2 shows the results.

TABLE 2

| Water-repellent emulsion compositions | Contact angle (°) | Permeability (ml/day) |
|---|---|---|
| from Example 4 | 90 | 0.3 |
| Comparison | 60 | 2.6 |

As is clearly shown in Table 2, the water-repellent emulsion composition (II) obtained in Example 4 showed a contact angle of 90°, and this value was much greater than that of the commercially available one used for comparison. The above data shows that the water-repellent emulsion composition (II) obtained in Example 4 is excellent in water repellency.

Further, the water-repellent emulsion composition (II) obtained in Example 4 showed a water permeability value of 0.3 ml/day, and this value was much smaller than that of the commercially available one used for comparison. The above data shows that the water-repellent emulsion composition (II) obtained in Example 4 is excellent in barrier properties against water absorption.

Test on dispersion stability

The water-repellent emulsion composition (II) obtained in Example 4 was placed in a 100 cc sample bottle, and allowed to stand at room temperature for 30 days to determine whether the emulsion composition would separate.

As a result the water-repellent emulsion composition (II) showed no separation, and it has been found that the water-repellent emulsion composition (II) is excellent in dispersion stability.

As explained above, according to the present invention, there are provided aqueous-dispersion water-repellent emulsion compositions having high dispersion stability and having improved water repellency and improved barrier properties against water absorption, and process for the production thereof.

What is claimed is:

1. A water-repellent emulsion composition consisting essentially of colloidal silica particles which are surface-treated with a silylating agent; a nonpolar organic solvent; a cationic surfactant; one or both of a nonionic fluorine-containing surfactant and a nonionic silicone-containing surfactant; water; and optionally a higher alcohol.

2. The composition according to claim 1, wherein the colloidal silica particles are contained in an amount of 0.1 to 30% by weight, the nonpolar organic solvent is contained in an amount of 1 to 40% by weight, the cationic surfactant is contained in an amount of 0.001 to 1% by weight, one or both of the nonionic fluorine-containing surfactant and the nonionic silicone-containing surfactant is or are contained in an amount of 0.01 to 0.5% by weight, and the water is contained in an amount of at least 20% by weight.

3. The composition according to claim 1, wherein the silylating agent is selected from the group consisting of alkyl-substituted halosilanes, alkyl-substituted alkoxysilanes, alkyl-substituted silazanes and hydroxysilanes obtained by hydrolysis of said alkyl-substituted halosilanes, alkoxysilanes or silazanes.

4. The composition according to claim 1, wherein the nonpolar organic solvent is selected from the group consisting of aromatic hydrocarbon solvents, alicyclic hydrocarbon solvents, aliphatic hydrocarbon solvents and mixtures thereof.

5. The composition according to claim 1, wherein the nonionic fluorine-containing surfactant is a fluorinated alkyl group containing a polyalkylene oxide compound.

6. The composition according to claim 1, wherein the nonionic silicone-containing surfactant is a polyalkylene-modified polydimethylsiloxane compound.

7. The composition according to claim 1, wherein the silylating agent is selected from the group consisting of octadecyltrichlorosilane, octadecylmethyldichlorosilane, octadecyldimethylchlorosilane, octadecyltrimethoxysilane, octadecylmethyldimethoxysilane, octadecyldimethylmethoxysilane and hexamethyldisilazane; the surface-treated colloidal silica particles are contained in an amount of 1 to 20% by weight; the nonpolar organic solvent is selected from the group consisting of benzene, toluene, xylene, ethylbenzene, cumene, cyclohexane, ethylcyclohexane, decalin, pentane, heptane, octane, mineral spirit, kerosene and mixtures thereof; the nonpolar organic solvent being contained in an amount of 5 to 20% by weight; the cationic surfactant being contained in an amount of 0.01 to 0.5% by weight; one or both of the nonionic fluorine-containing surfactant and the nonionic silicon-containing surfactant being contained in a total amount of 0.1 to 0.5% by weight; and the water being contained in an amount of 60% by weight or more.

8. The composition according to claim 1, wherein the nonpolar organic solvent is selected from the group consisting of industrial gasolines and petroleum solvents.

9. The composition according to claim 1, wherein the nonpolar organic solvent is a petrochemical solvent.

10. The composition according to claim 1, wherein the composition contains a higher alcohol in an amount of 0.1 to 5% by weight.

11. The composition according to claim 10, wherein the alcohol is selected from the group consisting of 2-pentanol, 3-pentanol, n-hexanol, n-heptanol and n-octanol; and the alcohol being contained in an amount of 1 to 5% by weight.

12. A process for the production of the water-repellent emulsion composition recited in claim 1, which comprises the steps of:
(a) adding a nonpolar organic solvent, a cationic surfactant and a silylating agent to a water-dispersed silica colloid to prepare an emulsion solution,
(b) dehydrating the emulsion solution and then concentrating the emulsion solution to prepare a hydrophobic silica sol solution, and
(c) adding at least one or both of a nonionic fluorine-containing surfactant and a nonionic silicone-containing surfactant to the hydrophobic silica sol solution and mixing the resultant mixture to form an emulsion.

13. The process according to claim 12, further comprising adding a higher alcohol to one or both of the nonionic fluorine-containing surfactant and the nonionic silicone-containing surfactant.

14. The process according to claim 12, wherein the silica is in a concentration of 1 to 50% by weight in the water-dispersed silica colloid; the amount of nonpolar organic solvent per gram of water in the water-dispersed silica colloid being 3 to 30 g; the cationic surfactant being in an amount of 0.001 to 10 g per gram of silica in the water-dispersed silica colloid; and the silylating agent being in an amount of 0.1 to 10 g per gram of silica in the water-dispersed silica colloid.

15. A water-repellent emulsion composition consisting essentially of colloidal silica particles which are surface-treated with a silylating agent; a cationic surfactant; a low-viscosity oil; a nonionic silicone-containing surfactant; and water.

16. The composition according to claim 15, wherein the colloidal silica particles are contained in an amount of 0.1 to 30% by weight, the cationic surfactant is contained in an amount of 0.001 to 1% by weight, the low-viscosity oil is contained in an amount of 0.1 to 10% by weight, the nonionic silicone-containing surfactant is contained in an amount of 0.01 to 1% by weight and the water is contained in an amount of 58 to 99% by weight.

17. The composition according to claim 15, wherein the silylating agent is selected from the group consisting of alkyl-substituted halosilanes, alkyl-substituted alkoxysilanes, alkyl-substituted silazanes and hydroxysilanes obtained by hydrolysis of said alkyl-substituted halosilanes, alkoxysilanes or silazanes.

18. The composition according to claim 15, wherein the nonpolar organic solvent is selected from the group consisting of aromatic hydrocarbon solvents, alicyclic hydrocarbon solvents, aliphatic hydrocarbon solvents and mixtures thereof.

19. The composition according to claim 15, wherein the nonionic silicone-containing surfactant is a polyalkylene-modified polydimethylsiloxane compound.

20. The composition according to claim 15, wherein the low-viscosity oil has a viscosity of 200 cSt or less; the low viscosity oil being in an amount of 0.5 to 5% by weight; the silylating agent being selected from the group consisting of octadecyltrichlorosilane, octadecylmethyldichlorosilane, octadecyldimethylchlorosilane, octadecyltrimethoxysilane, octadecylmethyldimethoxysilane, octadecyldimethylmethoxysilane and hexamethyldisilazane; the surface-treated colloidal silica particles being contained in an amount of 1 to 20% by weight; the cationic surfactant being contained in an amount of 0.01 to 0.5% by weight; the nonionic siliconcontaining surfactant being contained in an amount of 0.1 to 1% by weight; and the water being contained in an amount of 73 to 98% by weight.

21. A process for the production of the water-repellent emulsion composition recited in claim 15, which comprises the steps of:
(a) adding a nonpolar organic solvent, a cationic surfactant and a silylating agent to a water-dispersed silica colloid to prepare a first emulsion solution,
(b) azeotropically dehydrating the first emulsion solution to prepare a solution of dispersed silica sol in the nonpolar organic solvent,
(c) adding a low-viscosity oil, a nonionic silicone-containing surfactant and water to the solution of dispersed silica sol in the nonpolar organic solvent to prepare a second emulsion solution, and
(d) distilling off the nonpolar organic solvent contained in the second emulsion solution.

* * * * *